(12) United States Patent
Olcay et al.

(10) Patent No.: US 11,042,300 B2
(45) Date of Patent: Jun. 22, 2021

(54) COMMAND LOAD BALANCING FOR NVME DUAL PORT OPERATIONS

(71) Applicant: Toshiba Memory Corporation, Tokyo (JP)

(72) Inventors: Sancar Kunt Olcay, Sunnyvale, CA (US); Dishi Lai, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 381 days.

(21) Appl. No.: 14/674,632

(22) Filed: Mar. 31, 2015

(65) Prior Publication Data

US 2016/0291866 A1    Oct. 6, 2016

(51) Int. Cl.
*G06F 3/00* (2006.01)
*G06F 3/06* (2006.01)
*G06F 12/06* (2006.01)

(52) U.S. Cl.
CPC ........... *G06F 3/061* (2013.01); *G06F 3/0656* (2013.01); *G06F 3/0659* (2013.01); *G06F 3/0679* (2013.01); *G06F 12/0638* (2013.01); *G06F 2212/205* (2013.01)

(58) Field of Classification Search
CPC ............................ G06F 12/0246; G06F 3/0659
See application file for complete search history.

(56) References Cited

U.S. PATENT DOCUMENTS

| 5,519,847 | A | 5/1996 | Fandrich et al. | |
| 7,532,611 | B1* | 5/2009 | Jacks, Jr. | G08C 17/00 340/10.1 |
| 7,734,865 | B2 | 6/2010 | Tanaka et al. | |
| 7,970,986 | B2 | 6/2011 | Tanaka et al. | |
| 8,756,376 | B2 | 6/2014 | Tzeng | |
| 8,832,324 | B1* | 9/2014 | Hodges | G06F 13/1642 710/120 |
| 2008/0215926 | A1* | 9/2008 | Stenfort | G06F 13/4027 714/43 |
| 2010/0161941 | A1* | 6/2010 | Vyshetsky | G06F 9/38 712/205 |
| 2011/0167197 | A1 | 7/2011 | Leinwander | |
| 2012/0317348 | A1 | 12/2012 | Tzeng | |

(Continued)

*Primary Examiner* — Reginald G Bragdon
*Assistant Examiner* — Michael L Westbrook
(74) *Attorney, Agent, or Firm* — Kim & Stewart LLP

(57) ABSTRACT

In an example, a method of processing commands for a non-volatile storage device includes storing the commands among a plurality of first-level queues in a random access memory (RAM). Each command is assigned to a first-level queue based on membership in one of a plurality of first-level categories. The method further includes removing selected commands from the plurality of first-level queues according to a first schedule and performing at least one operation on the selected commands. The method further includes storing the selected commands among a plurality of second-level queues in the RAM. Each selected command is assigned to a second-level queue based on whether the command is a read command or a write command. The method further includes removing active commands from the plurality of second-level queues according to a second schedule. The method further includes issuing the active commands to a back end of the controller for processing.

13 Claims, 4 Drawing Sheets

(56) References Cited

U.S. PATENT DOCUMENTS

| | | | | |
|---|---|---|---|---|
| 2014/0325013 A1* | 10/2014 | Tamir | ............ | G06F 15/167 |
| | | | | 709/212 |
| 2015/0134857 A1* | 5/2015 | Hahn | ............ | G06F 3/061 |
| | | | | 710/5 |
| 2015/0186068 A1* | 7/2015 | Benisty | ............ | G06F 3/0673 |
| | | | | 711/154 |
| 2015/0301763 A1* | 10/2015 | Shaharabany | ............ | G06F 3/0613 |
| | | | | 711/115 |

* cited by examiner

COMMAND LOAD BALANCING FOR NVME DUAL PORT OPERATIONS

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

The performance of SSDs is not attributable only to the speed of reading from and writing to memory cells of SSDs, but also the time taken by the SSD controller to process the read and write commands issued by connected host systems. From the perspective of the host system, IO (input-output operation) latency is measured by the time it issues the read or write command to the SSD to the time the SSD responds with read data or a write acknowledgement. If there any delays between those two time periods, including delays attributable to the SSD controller, the host system will experience an increase in latency.

Further, read and write commands can be issued from multiple different queues in the host system, to multiple different namespaces on the SSD, across multiple different functions. The SSD can also have multiple ports for receiving read and write commands. Accordingly, command management for the SSD can be complex.

SUMMARY

One or more embodiments relate to a method of processing commands for a non-volatile storage device. The method includes storing the commands among a plurality of first-level queues in a random access memory (RAM). Each command is assigned to a first-level queue based on membership in one of a plurality of first-level categories. The method further includes removing selected commands from the plurality of first-level queues according to a first schedule. The method further includes performing at least one operation on the selected commands. The method further includes storing the selected commands among a plurality of second-level queues in the RAM. Each selected command is assigned to a second-level queue based on whether the command is a read command or a write command. The method further includes removing active commands from the plurality of second-level queues according to a second schedule. The method further includes issuing the active commands to a back end of the controller for processing.

One or more embodiments relate to a controller for a non-volatile storage device. The controller comprises a random access memory (RAM), and a processing system having a back end configured to process active commands and a front end. The front end is configured to store commands received from a host system among a plurality of first-level queues in the RAM, each command being assigned to a first-level queue based on membership in one of a plurality of first-level categories. The front end is further configured to remove selected commands from the plurality of first-level queues according to a first schedule. The front end is further configured to perform at least one operation on the selected commands. The front end is further configured to store the selected commands among a plurality of second-level queues in the RAM, each selected command being assigned to a second-level queue based on whether the command is a read command or a write command. The front end is further configured to remove the active commands from the plurality of second-level queues according to a second schedule. The front end is further configured to issue the active commands to the back end for processing.

One or more embodiments relate to a non-transitory computer readable medium having instructions thereon that when executed by a processor cause the processor to perform the method recited above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for command load balancing for a non-volatile memory storage device are described. In an embodiment, a front end to the non-volatile memory storage device establishes multiple command queue levels to balance command load. In a first queue level, commands are inserted into queues based on command categories. Command categories can be defined by at least one of namespace, port, function, or host queue ID. The front end selects commands from the first-level queues using a first schedule, such as a round robin schedule. In this manner, command load is balanced across the command categories. The selected commands are inserted into a second level of queues based on command type. Command types can be defined by at least one of whether the command is a read command or write command, whether the command is a large operation, or on which port the command originated. The front end selects commands from the second-level queues using a second schedule. In an embodiment, the second schedule is a round robin schedule. In another embodiment, the second schedule is a weighted round robin schedule based on eligibility of the second-level queues. All queues in font end can be implemented as linked-lists and can share a single command memory.

A conventional front end processes commands in the order received. If commands are processed in the order received, heave load on a particular function, port, or namespace would delay all other commands, causing large swings in command latency. In the techniques described herein, command load is balanced across two different queue levels based on defined command categories and command types, which normalizes command latencies and prevents delays in command execute due to command load. The techniques can be implemented with minimal area increase and with little or no performance degradation. The techniques described herein minimize the effect that traffic on one port, namespace, function, and/or host queue ID has on traffic on another port, namespace, function, or host queue ID. Furthermore, with the techniques described herein, commands with smaller data transfer sizes will have higher priority and will not get stuck behind previous commands having larger data transfer sizes. These and other aspects of the disclosed techniques are described with respect to the following figures.

Figure 1:
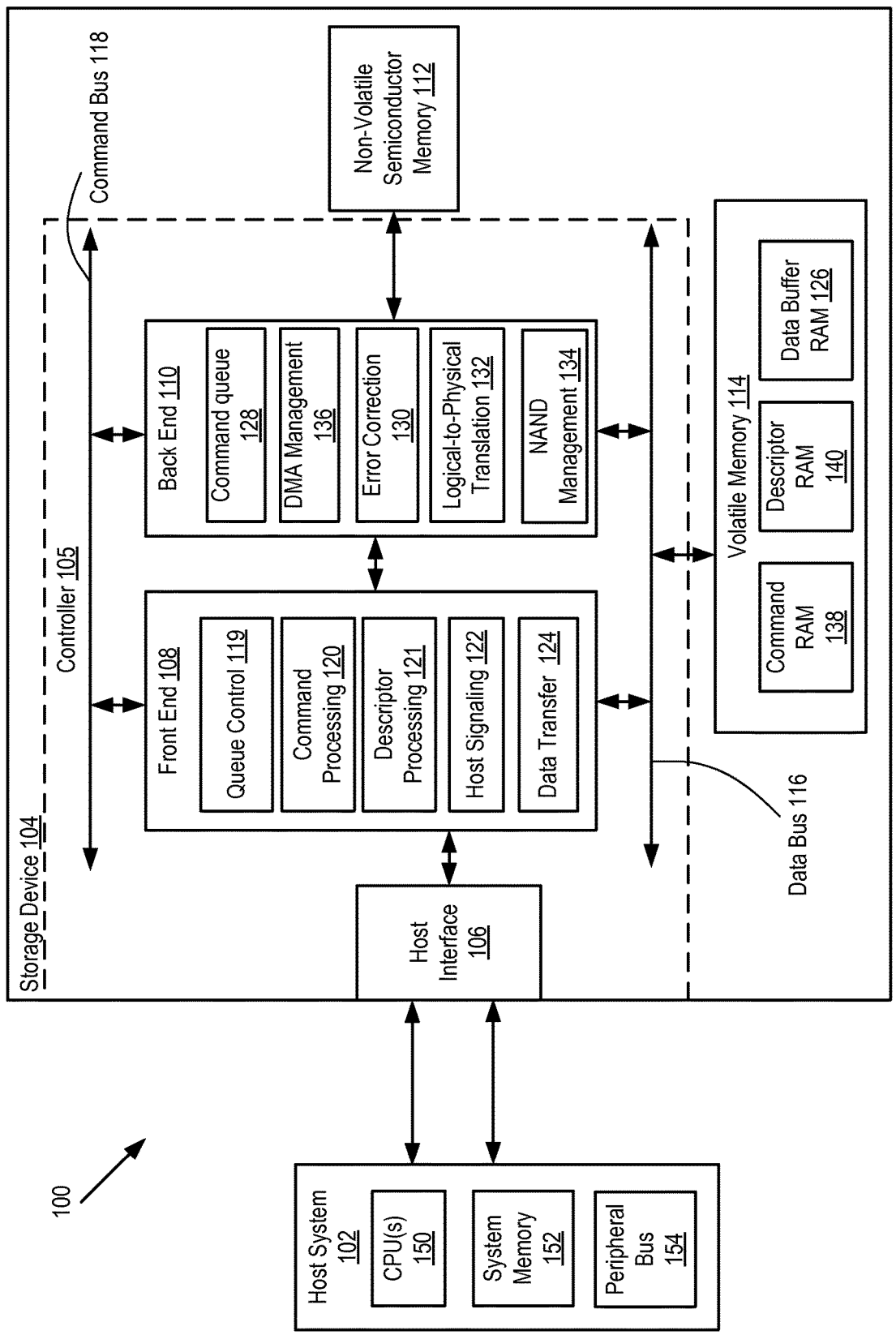
FIG. 1 is a block diagram showing an example of a computing system including a storage device in communication with a host system.

FIG. 1 is a block diagram showing an example of a computing system 100 including a storage device 104 in communication with a host system 102. Host system 102 is a computing system that comprises one or more central processor units (CPUs) 150, a system memory 152, a peripheral bus 154, and other components as is generally known. CPUs 150 can include any type of microprocessor(s) known in the art. System memory 152 may include, for example, random access memory (RAM), read only memory (ROM), or a combination thereof. Peripheral bus 154 can be any type of computer bus interface, such as a peripheral component interconnect express (PCIe) bus, serial advanced technology attachment (SATA) bus, or the like. Storage device 104 provides non-volatile storage functionality for use by host system 102. Storage device 104 can be a solid-state drive ("SSD"), which is a non-volatile storage device that includes non-volatile semiconductor-based storage elements, such as NAND-based flash memory, as the storage medium (as opposed to, for example, the magnetic medium used in hard disk drives).

Storage device 104 includes an SSD controller 105, volatile memory 114, and non-volatile semiconductor memory 112. Storage device 104 may also include other elements not shown, such as power supply circuitry (including circuitry for transferring power to the SSD controller 105, volatile memory 114, and non-volatile semiconductor memory 112, as well as capacitors for buffering the power supply), indicator light circuitry, temperature sensors, boot circuitry, clock circuitry, and other circuitry for assisting with various functions.

SSD controller 105 receives and processes commands from host system 102 in order to perform operations on the non-volatile semiconductor memory 112. Commands from host system 102 include requests to read or write to locations within the non-volatile semiconductor memory 112, and various administrative commands, such as commands for querying the feature set of storage device 104, commands for formatting non-volatile memory 112, commands for creating and modifying various types of queues, commands for requesting notification of various events, and various other commands. SSD controller 105 includes a host interface 106, a front end 108, a back end 110, a command bus 118, and a data bus 116.

Host interface 106 comprises circuitry for communicating with host system 102. In one embodiment, host interface 106 is coupled to peripheral bus 154 in host system 102 through one or more ports (e.g., two ports are shown). For example, host interface 106 can be a PCIe interface that communicates according to the PCIe standard, and SSD controller 105 can comply with the non-volatile memory host controller interface specification (NVMHCI) referred to as "NVM express" or "NVMe." In another embodiment, the interface is a SATA interface.

Front end 108 communicates with host system 102 to receive, organize, and forward commands from host system 102 to back end 110. Front end 108 also forwards status data from back end 110 to host system 102. Back end 110 performs tasks associated with commands received from front end 108, accessing non-volatile semiconductor memory 112 as needed in accordance with these tasks. Back end 110 employs direct memory access (DMA) to store and retrieve data from system memory 152 of host system 102. For example, back end 110 can transfer data that has been read from non-volatile semiconductor memory 112 to system memory 152 using DMA. Back end 110 can transfer data to be written to non-volatile semiconductor memory 112 from system memory 152 using DMA.

Both front end 108 and back end 110 are coupled to a command bus 118 and a data bus 116. Command bus 118 functions to transfer command-related data between various sub-units of front end 108 and back end 110, and data bus 116 serves to transfer data between volatile memory 114 and various sub-units of front end 108 and back end 110. Volatile memory 114 can include one or more types of RAM, such as static RAM (SRAM), dynamic RAM (DRAM), or the like.

Volatile memory 114 can include RAM modules or specific regions of RAM dedicated to storing particular types of data. In an embodiment, volatile memory 114 includes command RAM 138 configured to store commands received from host system 102, descriptor RAM 140 configured to store DMA descriptors received from host system 102. Data buffer RAM 126 configures a read cache and a write cache. A read cache temporarily stores data read from non-volatile semiconductor memory 112 ("read data") in response to a command from host system 102. A write cache temporarily stores data to be written to non-volatile semiconductor memory 112 ("write data") in response to a command from host system 102.

While command RAM 138, descriptor RAM 140, and data buffer RAM 126 are shown as being part of a single group of volatile memory coupled to data bus 116, other configurations are possible. For example, command RAM 138 and descriptor RAM 140 can be part of a group of volatile memory only coupled to front end 108, and data buffer RAM 126 can be part of a group of volatile memory only coupled to back end 110. In such an example, front end 108 can forward command and descriptor data to back end 110 over a bus (e.g., command bus 118 or data bus 116) or by a direct link to back end 110, rather than back end 110 having direct access to command and descriptor data in volatile memory 114.

Non-volatile semiconductor memory 112 stores data in a non-volatile manner at the request of host system 102. Non-volatile semiconductor memory 112 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory. As NAND-based flash memory is commonly used as the non-volatile semiconductor memory 112, non-volatile semiconductor memory 112 may be referred to herein as NAND memory 112 or simply as NAND 112.

Front end 108 includes multiple functional units, including queuing control unit 119, command processing unit 120, descriptor processing unit 121, host signaling unit 122, and data transfer unit 124. Command processing unit 120 fetches commands issued by host system 102. Command processing unit 120 provides the commands to queuing control unit 119. Queuing control unit 119 stores the commands in command RAM 138. Queuing control unit 119 implements command load balancing to select eligible commands to be performed by back end 110. Command processing unit 120 forwards commands selected by queuing control unit 119 to back end 110 for processing. Command processing unit 120 can also perform various operations on commands, such as command checks. Command processing unit 120 also receives status information for the commands from back end 110. Descriptor processing unit 121 fetches DMA descriptors from host system 102 associated with the commands. For example, the DMA descriptors point to write and read buffers in system memory 152 for write and read commands. Descriptor processing unit 121 stores received descriptors for the commands in descriptor RAM 140.

Host signaling unit 122 can transmit command status information obtained from command processing unit 120 to host system 102. Host signaling unit 122 generates host notification signals and transmits these signals to host system 102. These signals may be used to indicate that one or more commands submitted by host system 102 are complete. Host notification signals include interrupts and may be out-of-band, pin-based interrupts, or may be in-band message signaled interrupts ("MSI" or "MSIx"). The interrupts include data identifying the command that has been completed as well as status data associated with that command. Host signaling unit 122 includes an interrupt table that includes such information, as well as an interrupt generator which generates interrupts for transmission to host system 102, based on the information stored in the interrupt table.

Host system 102 can maintain various command queues in system memory 152 (not shown), such as submission queues and completion queues. Submission queues store commands sent to SSD controller 105, and completion queues store information about commands completed by SSD controller 105. Host system 102 also maintains write data buffers and read data buffers (not shown) in system memory 152. Host system 102 also maintains DMA descriptors (not shown) associated with the write and read data buffers in system memory 152.

Data transfer unit 124 serves as an intermediary between host interface 106 and the sub-units of front end 108 (e.g., queue control unit 119, command processing unit 120, and descriptor processing unit 121). Data transfer unit 124 directs data received from host interface 106 to the appropriate sub-unit (e.g., command data to command processing unit 120 and descriptor data to descriptor processing unit 121).

Back end 110 includes multiple functional units, including a command queue 128, an error correction unit 130, a logical-to-physical address translation unit 132, a NAND management unit 134, and DMA management unit 136. Command queue 128 stores commands received from front end 108 for further processing. Buffering commands in this manner allows back end 110 to process received commands based on a particular schedule or on specific timing or state-based constraints. Error correction unit 130 provides error correction functionality for data stored in non-volatile semiconductor memory 112. Error correction unit 130 generates error-correction data for data written to the non-volatile semiconductor memory 112 and stores the error-correction data with the written data. When the written data is read out and error in reading is encountered, error correction unit 130 performs error correction operations using the error-correction data.

Logical-to-physical translation unit 132 translates logical addresses, e.g., logical block addresses (LBAs), to physical addresses, e.g., physical block addresses, of non-volatile semiconductor memory 112 during reading or writing data. Logical-to-physical translation unit 132 accesses a map, known as a flash translation layer (FTL), when converting logical addresses to physical addresses so that data requested by host system 102 with a logical address can be properly physically addressed within non-volatile semiconductor memory 112.

NAND management unit 134 is configured to write data to non-volatile semiconductor memory 112 and read data from non-volatile semiconductor memory 112. NAND management unit 134 stores data read from non-volatile semiconductor memory 112 in a read cache in data buffer RAM 126. NAND management unit 134 receives data to be written to non-volatile semiconductor memory 112 from a write cache in data buffer RAM 126. NAND management unit 134 may also provide other functions, such as wear leveling, bad block mapping, garbage collection, and read scrubbing.

Wear leveling is a technique to compensate for the fact that a (relatively) limited number of write operations can be performed on each NAND data storage element, commonly referred to as a block. Wear leveling comprises periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are not written to or read from.

Garbage collection is a technique whereby valid pages (a subunit of a block) within a block are copied to a new block so that the source block can be erased. Garbage collection is needed in NAND memory because the unit of writing is a page and the unit of erasure is a block. Accordingly, if a command to write data targets an existing page, then the data of the existing page is not actually modified. Instead, a new page is written and the old page is marked as invalid. As a result, the number of invalid pages continue to grow and garbage collection becomes necessary to free up blocks having a large number of invalid pages.

Read scrubbing is a technique whereby SSD controller 105 periodically reads data in the non-volatile semiconductor memory 112, performs error checking operations on the data to determine if there are errors, corrects errors that are found, and then writes the error-corrected data back to the same location. This technique helps to reduce the amount of errors experienced when reading data out from the non-volatile semiconductor memory 112.

DMA management unit 136 is configured to control DMA transfer of data between SSD controller 105 and system memory 152 in host system 102. DMA management unit 136 uses DMA descriptors obtained by front end 108, which point to read and write buffers in system memory 152. DMA management unit 136 transfers data from a read cache in data buffer RAM 126 to system memory 152 using corresponding DMA descriptors associated with a corresponding read command. DMA management unit 136 transfers data to write cache in data buffer RAM 126 from system memory 152 using corresponding DMA descriptors associated with a corresponding write command.

In various embodiments, the functional blocks included in front end 108 and back end 110 represent hardware or combined software and hardware elements for performing associated functionality. Thus, any or all of the functional blocks may be embodied as firmware executing in a processing unit, as hardware units that are hard-wired to perform the associated functionality, or as a combination thereof. For example, either or both of front end 108 or back end 110 may include one or more processors, one or more state machines, one or more application specific integrated circuits (ASICs), one or more programmable integrated circuits, or the like, that are programmed or configured to perform functions related to the functional blocks. Alternatively, a single processor may be shared between and thus may perform the functions of both front end 108 and back end 110.

Certain functional blocks and functionality associated therewith that are depicted as being included within front end 108 or back end 110 may be implemented as data structures stored within volatile memory 114. Thus, for example, queues indicated as being included in front end 108 and back end 110, may be stored within volatile memory 114. While specific functional units are shown in front end 108 and back end 110, other configurations of functional units can be used to implement the functionality described herein. In general, front end 108 and back end 110 can include one or more functional units that perform the functionality described herein.

In various examples described herein, front end 108 and functions thereof are described as being part of SSD controller 105 in storage device 104. In another embodiment, front end 108 can be separate from SSD controller 105 and/or separate from storage device 104. For example, front end 108 can be part of a controller external to storage device 104. In another embodiment, front end 108 can be implemented by host system 102. For example, the functions performed by front end 108 described above can be implemented in software executed by CPUs 150 in host system 102. Command RAM 138 and descriptor RAM 140 can be part of system memory 152. In such an embodiment, front end 108 is omitted from SSD controller 105 in storage device 104. In still another embodiment, functions of front end 108 can be divided between host system 102 and controller 105 in storage device 104.

Figure 2:
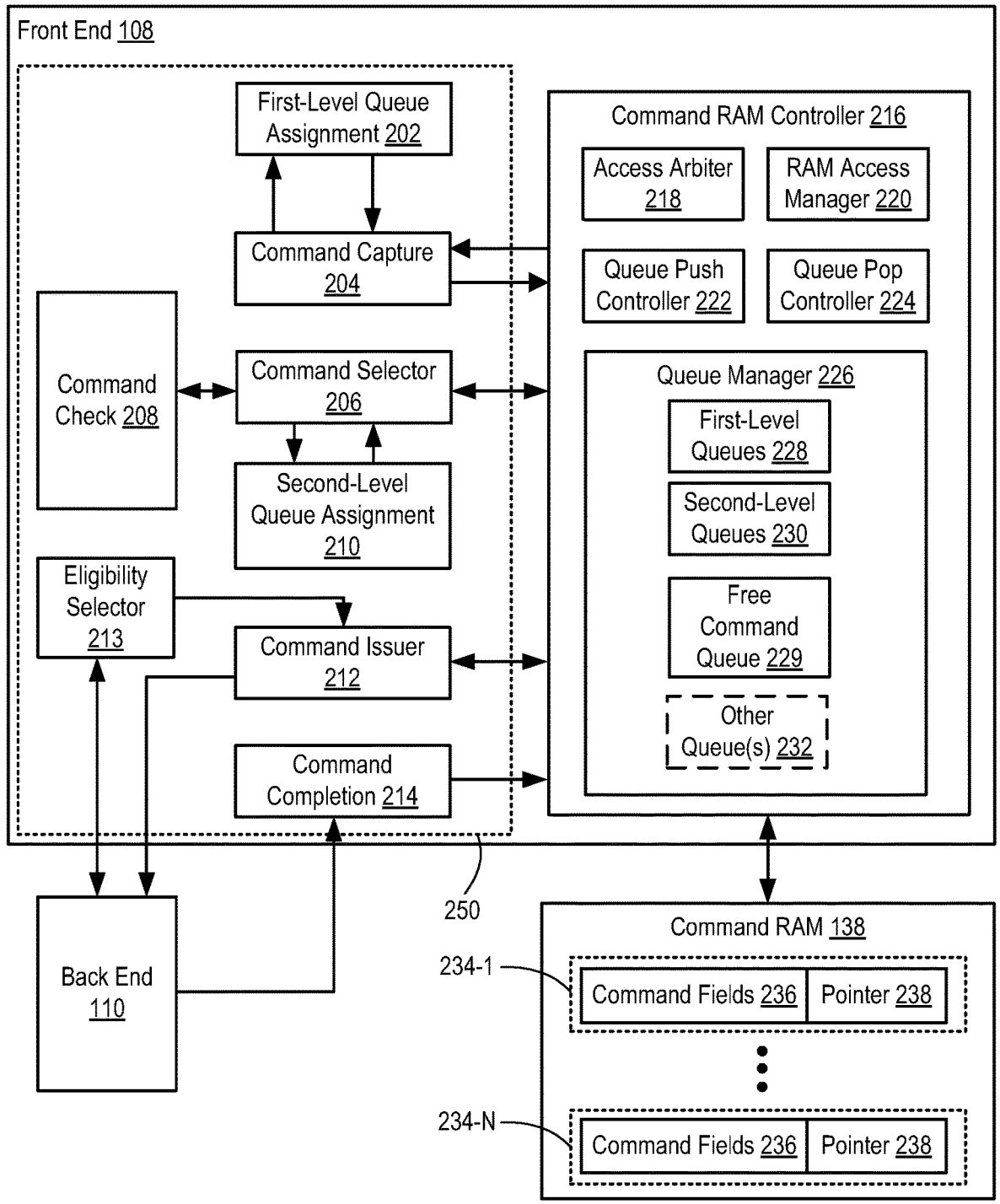
FIG. 2 is a block diagram showing an example of a front end 108 of a storage device controller.

FIG. 2 is a block diagram showing an example of front end 108 in more detail. FIG. 2 shows the functions of queuing control unit 119 and command processing 120. Other functions are omitted for clarity. Front end 108 includes a command control unit 250 coupled to a command RAM controller 216. Command control unit 250 is coupled to back end 110. Command RAM controller 216 is coupled to command RAM 138.

Command control unit 250 is configured to fetch commands from host system 102 and to pass the commands to command RAM controller 216. Command control unit 250 is also configured to obtain selected commands from command RAM controller 216 and to perform one or more operations on the selected commands. Command control unit 250 is further configured to pass the selected commands back to command RAM controller 216 for further queuing. Command control unit 250 is further configured to obtain active commands from command RAM controller 216 and issue active commands to back end 110 for processing. Command control unit 250 is further configured to determine eligible command queues from which to issue active commands. Command control unit 250 is further configured to obtain command status from back end 110. In an example, command control unit 250 performs such functions using a command capture unit 204, a first-level queue assignment unit 202, a command selector unit 206, a second-level queue assignment unit 210, a command issuer unit 212, an eligibility selector unit 213, and a command completion unit 214. The command control unit 250 can also include or otherwise communicate with a command check unit 208.

Command RAM controller 216 is configured to receive commands from command control unit 250. Command RAM controller 216 is further configured to store the commands in command RAM 138. Command RAM controller 216 is further configured to manage a plurality of queues of commands ("command queues"). Command RAM controller 216 is further configured to enqueue or "push" commands into specific command queues, and dequeue or "pop" commands from specific command queues. Command RAM controller 216 is further configured to arbitrate selection among the command queues. In an example, command RAM controller 216 performs such functions using an access arbiter unit 218, a RAM access manager unit 220, a queue push controller unit 222, a queue pop controller unit 224, and a queue manager unit 226.

In operation, command capture unit 204 receives input commands. Command capture unit 204 communicates with command RAM controller 216 to obtain a command ID for each input command. Queue manager 226 maintains various queues, including a free command queue 229. Free command queue 229 stores free (unused) command IDs that can be assigned to input commands. Command RAM 138 includes space to store a particular number of commands. In an embodiment, command RAM 138 can store N words 234-1 through 234-N (collectively referred to as "words 234" or generally referred to as "a word 234"). A command can be stored in a word 234. In an embodiment, a word 234 comprises command fields 236 for a command and a pointer 238. Command fields 236 include various data associated with a command, as described below. Pointer 238 can store an address in command RAM 138 to another word 234, as described below. In an embodiment, command RAM controller 216 supports N command IDs, where each command ID comprises an address of a word 234 in command RAM 138.

Command capture unit 204 communicates with first-level queue assignment unit 202 to obtain a first-level queue assignment for each input command. Queue manager 226 maintains first-level queues 228 and second-level queues 230 for command load balancing. Queue manager 226 can maintain various queues by keeping track of where corresponding commands are stored in command RAM 138. In an embodiment, first-level queues 228 and second-level queues 230 comprise linked-lists of commands. Each of first-level queues 228 and second-level queues 230 is specified by a head pointer and a tail pointer. Within a given queue, pointer 238 is used to link one word (command) to another word (command). In an embodiment, queue manager 226 can maintain one or more other queues 232 of commands in command RAM 138. For example, other queue(s) 232 can include read pre-fetch queues that store read commands for which back end 110 has read data from non-volatile semiconductor memory 112, but for which the read data is still in data buffer RAM 126 and waiting for DMA transfer to system memory 152. Such "pre-fetch" read queues can include read commands for which DMA transfer is pending (e.g., DMA descriptors have yet to be fetched from host system 102).

Queue manager 226 can maintain any number of first-level queues 228. First-level queue assignment unit 202 maintains a relation between each of first-level queues 228 and a particular command category. For example, queue manager 226 can include 16 first-level queues 228 and first-level queue assignment unit 202 can organize the input commands into 16 command categories. The command categories can be defined based on one or more attributes of the input commands. In an embodiment, the command categories are defined based on at least one of a function ID, a port ID, a namespace ID, or a host queue ID. Host system 102 can organize commands into one or more functions, each having a particular function ID. SSD controller 105 can include one or more ports, each having a particular port ID.

Back end 110 can manage one or more logical divisions or "namespaces" in non-volatile semiconductor memory 112, each having a particular namespace ID. Host 102 can maintain one or more submission queues, each having a particular host queue ID. Any combination of such IDs can be used to define the command categories. In one non-limiting example, first-level queues 228 can include eight queues per port. For each port, the eight queues can hold commands for eight different functions or eight different namespaces.

Command capture unit 204 provides the input commands to command RAM controller 216, and RAM access manager unit 220 stores the input commands in command RAM 138. Queue push controller unit 222 pushes the input commands into associated first-level queues 228 based on queue assignment by first level-queue assignment unit 202. Access arbiter unit 218 selects commands from first-level queues 228 according to a schedule. In an embodiment, access arbiter unit 218 implements a round robin scheduling scheme to select commands from first-level queues 228. Queue pop controller unit 224 pops the selected commands from first-level queues 228 based on the schedule implemented by access arbiter unit 218.

By selecting among first-level queues 228 using access arbiter unit 218, commands are balanced across the command categories. Thus, no one port, function, namespace, or host queue ID can dominate another regardless of the order in which the commands are received. Performance of a single command received for one namespace, port, function, or host queue is not dependent on performance of a large number of earlier commands received for another namespace, port, function, or host queue. As such, first-level queues 228 reduce command latency across the ports, namespaces, functions, and host queues.

Command selector unit 206 receives the selected commands from command RAM controller 216. Command selector unit 206 initiates one or more operations on the selected commands. In an embodiment, command selector unit 206 initiates a command check on each of the selected commands. Command selector unit 206 can pass the selected commands to command check unit 208 for performing a command check operation. The command check operation can determine whether a given command is a valid command or invalid command. If the command is invalid, command check unit 208 can signal host system 102 (e.g., through host signaling unit 122) of the invalid command. Command check unit 208 can signal queue manager 226 to free the command ID of an invalid command.

Command selector unit 206 obtains second-level queue assignments for selected commands (e.g., valid commands) from second-level queue assignment unit 210. Second-level queue assignment unit 210 selects one of second-level queues for each received command based on command type. A command type can be defined by whether the command is a read command or a write command. A command type can be further defined by whether the command is a large operation (e.g., whether the command is associated with a large data transfer) based on a particular threshold. A command type can be further defined by which port of the SSD controller 105 the command originated. According, in an embodiment, second-level queues 230 include queue(s) for read commands, queue(s) for large read commands, queue(s) for write commands, and queue(s) for large write commands. The queue(s) for the read commands, write commands, large read commands, and large write commands can be further divided by port ID. In a non-limiting example, SSD controller 105 can include two ports and second-level queues 230 can include eight queues, four queues for the first port and four queues for the second port. Each set of four queues includes queues for read, write, large read, and large write commands. Other second-level queue configurations can be established based on command type.

Command selector unit 206 passes selected commands having second-level queue assignments back to command RAM controller 216. Queue push controller unit 222 pushes the received commands into second-level queues 230 as assigned by second-level queue assignment 210. Access arbiter unit 218 selects active commands from second-level queues 230 according to a schedule. In an embodiment, access arbiter unit 218 implements a round robin scheduling scheme to select commands from second-level queues 230. Queue pop controller unit 224 pops the selected commands from second-level queues 230 based on the schedule implemented by access arbiter unit 218. In an embodiment, access arbiter unit 218 only selects from eligible queues of second-level queues 230, as discussed below.

Eligibility selector unit 213 communicates with back end 110 to determine command processing status. Command processing status can indicate status of a read cache or write cache in data buffer RAM 126, status of write transfers or read transfers performed by DMA management unit 136, or any other information indicative of the status of command processing performed by back end 110. Eligibility selector unit 213 can determine eligible queues in second-level queues 230 based on command processing status from back end 110. For example, if the write cache is near full, the eligibility selector unit 213 can render write and/or large write queue(s) ineligible. If DMA management unit 136 has a large number of active write transfers, eligibility selector unit 213 can render the write and/or large write queues as ineligible. The same conditions can be applied to read and/or large read queues. In an embodiment, access arbiter unit 218 only selects from eligible queues in second-level queues 230 as determined by eligibility selector unit 213.

Command issuer unit 212 receives active commands from command RAM controller 216. Command issuer unit 212 issues the active commands to back end 110 for processing. In an embodiment, command issuer unit 212 can supply command IDs to back end 110, and back end 110 can obtain command data from command RAM 138. In another embodiment, command issuer unit 212 can supply the command ID and the command data to back end 110 without back end 110 accessing command RAM 138.

Command completion unit 214 receives notifications from back end 110 of completed commands. Command completion unit 214 can signal host system 102 (e.g., through host signaling unit 122) of the completed command. Command completion unit 214 can signal queue manager 226 to free the command ID of the completed command.

While specific functional units are shown in front end 108, other configurations of functional units can be used to implement the functionality described herein. In general, front end 108 can include one or more functional units that perform the functionality described with respect to FIG. 2.

Figure 3:
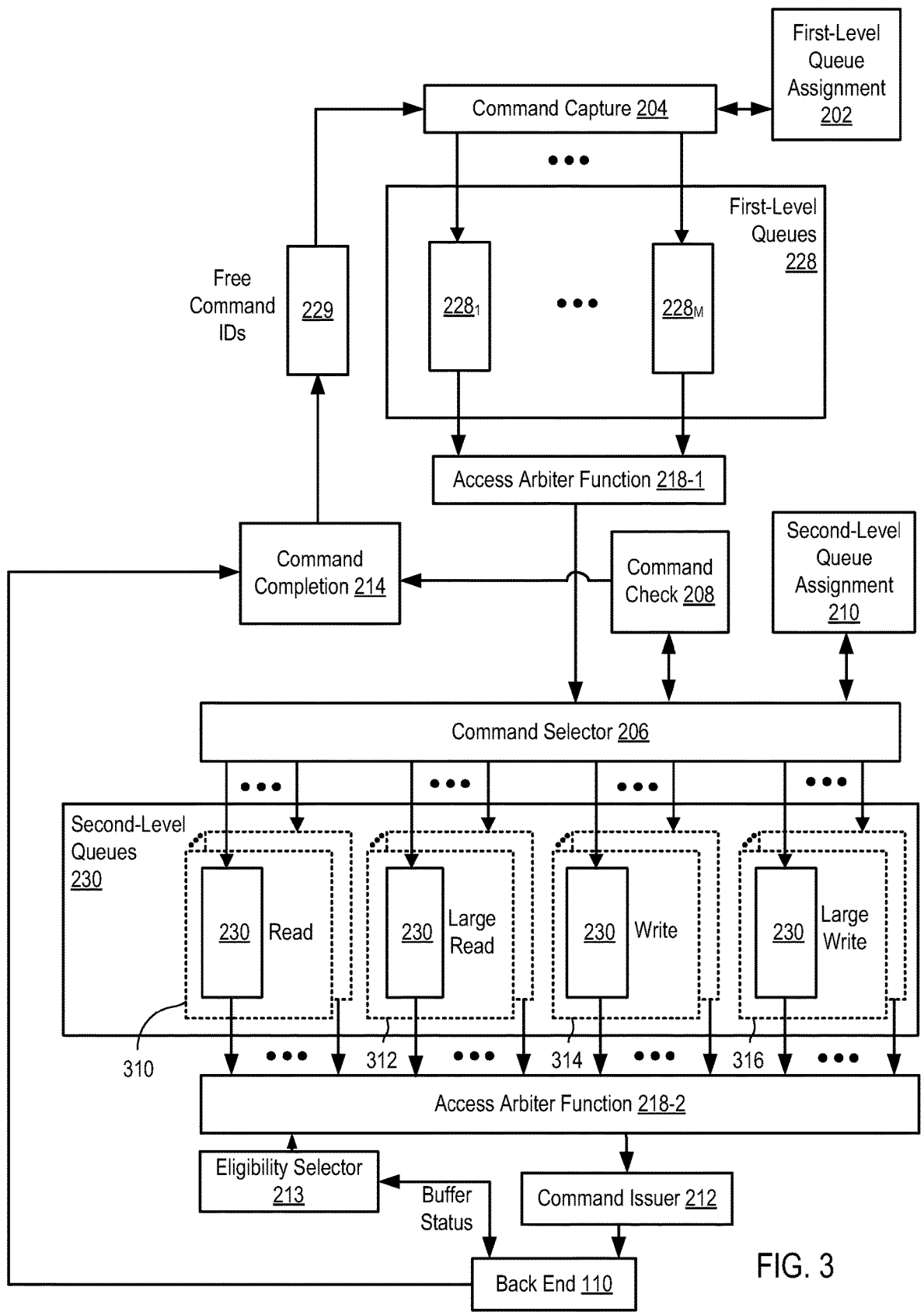
FIG. 3 is a block diagram illustrating an example of command and control flow through the front end of FIG. 2.

FIG. 3 is a block diagram illustrating an example of command and control flow through front end 108. Command capture unit 204 receives input commands and communicates with first-level queue assignment unit 202 to obtain first-level queue assignments. Command capture unit 204 obtains free command IDs from free command queue 229. Command RAM controller 216 pushes the commands into first-level queues 228 according to the first-level queue assignment. In the example shown in FIG. 3, command RAM controller 216 established M first-level queues 2281 through 228M, where M in an integer greater than one. A first function of access arbiter unit 218 (access arbiter function 218-1) obtains selected commands from the first-level queues 228 according to a first schedule (e.g., a round-robin schedule). Command selector unit 206 receives selected commands from access arbiter unit 218. Command selector unit 206 initiates one or more operations on selected commands, such as a command check performed by command check unit 208. If a command check identifies invalid commands, command check unit 208 signals command completion unit 214 to free the command ID for the command, and signals host system 102 of the invalid command (not shown).

Command selector unit 206 pushes selected commands into second-level queues 230 according to the second-level queue assignments. In the example shown in FIG. 3, second-level queues are divided into four groups 310, 312, 314, and 316. Group 310 includes read queues for one or more ports; group 312 includes large read queues for one or more ports; group 314 includes write queues for one or more ports; and group 316 includes large write queues for one or more ports. A second function of access arbiter unit 218 (access arbiter function 218-2) obtains active commands from second-level queues 230 according to a second schedule (e.g., another round-robin schedule). Eligibility selector 213 signals access arbiter unit 218 on which of second-level queues 230 are eligible for selection of active commands. Eligibility selector unit 213 obtains command processing information from back end 110. Command issuer unit 212 issues active commands to back end 110 for processing. Back end 110 signals command completion unit 214 of completed commands.

Figure 4:
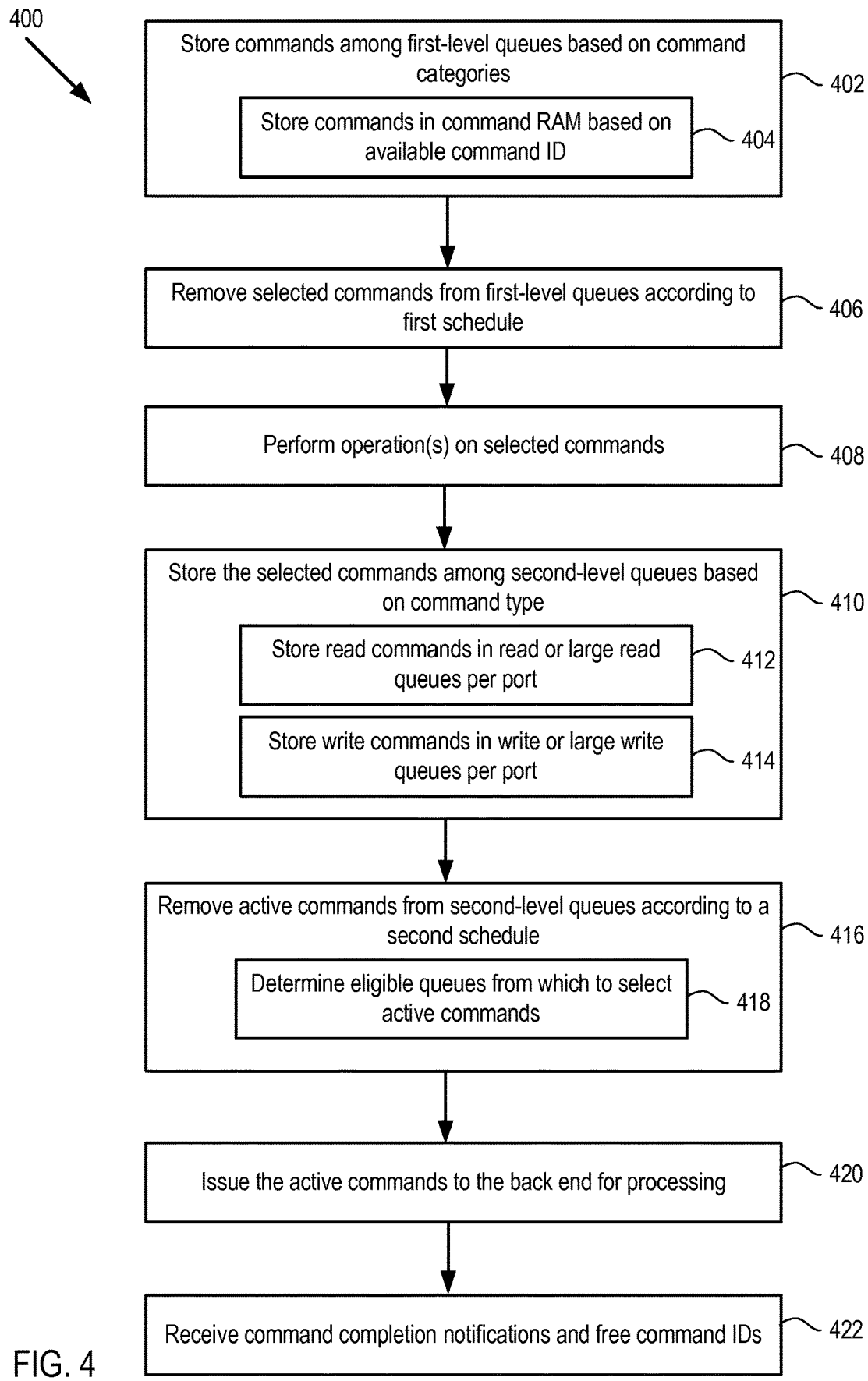
FIG. 4 is a flow diagram depicting a method of processing commands received from a host system at a controller of a non-volatile storage device according to an embodiment.

FIG. 4 is a flow diagram depicting a method 400 of processing commands received from a host system at a controller of a non-volatile storage device according to an embodiment. Method 400 can be performed by front end 108 of SSD controller 105 discussed above. Method 400 begins at operation 402, where front end 108 stores commands among first-level queues 228 based on command categories. Various command categories can be established based on at least one of namespace ID, port ID, function ID, and host queue ID. Operation 402 can include an operation 404, where front end 108 stores commands in command RAM 138 based on available command ID.

At operation 406, front end 108 removes selected commands from first level queues 228 according to a first schedule. In an embodiment, the first schedule comprises a round-robin schedule. At operation 408, the front end 108 performs one or more operations on the selected commands. In an embodiment, the front end 108 performs a command check operation on the selected commands.

At operation 410, front end 108 stores selected commands among second-level queues 230 based on command type. Various command types can be established based on at least one of whether the command is a read command or a write command, whether the command is a large operation, or on which port the command originated. Operation 410 can include operations 412 and 414. At operation 412, front end 108 can store read commands in read or large read queues per port. At operation 414, front end 108 can store write commands in write or large write queues per port.

At operation 416, front end 108 removes active commands from second-level queues 230 according to a second schedule. In an embodiment, the second schedule comprises a round robin schedule. In another embodiment, the second schedule comprises a weighted round robin schedule based on second-level queue eligibility. Operation 416 can include an operation 418, where front end 108 determines eligible queues of second-level queues 230 from which to select active commands. Front end 108 can determine queue eligibility based on command processing information from back end 110, as discussed above.

At operation 420, front end 108 issues the active commands to back end 110 for processing. At operation 422, front end 108 receives command completion notifications from back end 110 and frees command IDs for use by additional input commands.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

We claim:

1. A method of processing commands in a controller of a non-volatile storage device that includes the controller, a host interface having a plurality of ports through which commands are received from a host system, a random access memory (RAM), and a non-volatile semiconductor memory, the method comprising the steps of:
    (a) storing, by a front end of the controller, a command received from the host system into one first-level queue among a plurality of first-level queues that correspond to a port ID of one of the ports and are each configured in the RAM to store commands for a different one of a plurality of namespaces, the command being assigned to the one first-level queue corresponding to a particular namespace of the command among the plurality of first-level queues;
    (b) removing, by the front end of the controller, the command from the plurality of first-level queues according to a first schedule;
    (c) after step (b) of removing, performing, by the front end of the controller, at least one operation on the command, the at least one operation comprising a command check operation to determine whether the command is a valid command or an invalid command;
    (d) after step (c) of performing, storing, by the front end of the controller, the command into one second-level queue among a plurality of second-level queues in the RAM, the command being stored in the one second-level queue that is a read queue if the command is a read command and the one second-level queue that is a write queue if the command is a write command;
    (e) removing, by the front end of the controller, the command from the one second-level queue among the plurality of second-level queues according to a second schedule; and
    (f) transferring the command from the front end of the controller, to a back end of the controller for processing.

2. The method of claim 1, wherein
    the command is stored in a large read queue if the command is determined to be a large read command according to a first threshold; and
    the command is stored in a large write queue if the command is determined to be a large write command according to a second threshold.

3. The method of claim 1, wherein the operation of removing the command from the one second-level queue comprises:
    determining at least one eligible second-level queue of the plurality of second-level queues based on command processing status received from the back end; and
    removing the command from the one second-level queue according to the second schedule if the one second-level queue is one of the at least one eligible second-level queue.

4. The method of claim 1, wherein the operation of storing the command comprises:
    assigning a command identifier removed from a command identifier queue to the command; and
    storing the command in the RAM using the command identifier thereof as an address.

5. The method of claim 4, further comprising:
    receiving a notification from the back end for when the command has completed; and
    adding the command identifier for the command to the command identifier queue.

6. The method of claim 1, wherein each of the plurality of first-level queues and each of the plurality of second-level queues comprises a linked list.

7. The method of claim 1, wherein when the command check operation determines that the command is an invalid command, the controller informs the host system through the host interface that the command is an invalid command, and the controller instructs a signal queue manager to free a command ID associated with the command, for assignment to another command.

8. A non-volatile storage device connectable to a host system, comprising:
    a host interface having a plurality of ports through which commands are received from the host system which maintains command queues including submission queues and completion queues, wherein the submission queues store commands sent to the non-volatile storage device, and the completion queues store information about commands completed by the non-volatile storage device;
    a random access memory (RAM);
    a non-volatile semiconductor memory; and
    a controller having a back end configured to process active commands received from the host system via a front end by accessing the non-volatile semiconductor memory and the front end configured to:
    (a) store a command received from the host system into one first-level queue among a plurality of first-level queues that correspond to a port ID of one of the ports and are each configured in the RAM to store commands for a different one of a plurality of namespaces, the command being assigned to the one first-level queue corresponding to a particular namespace of the command among the plurality of first-level queues;
    (b) remove the command from the plurality of first-level queues according to a first schedule;
    (c) after (b), perform at least one operation on the command, the at least one operation comprising a command check operation to determine whether the command is a valid command or an invalid command;
    (d) after (c), store the command into one second-level queue among a plurality of second-level queues in the RAM, the command being stored in the one second-level queue that is a read queue if the command is a read command and the one second-level queue that is a write queue if the command is a write command;
    (e) remove the command from the one second-level queue among the plurality of second-level queues according to a second schedule; and
    (f) issue the command to the back end for processing.

9. The non-volatile storage device of claim 8, wherein
the command is stored in a large read queue if the command is determined to be a large read command according to a first threshold; and
the command is stored in a large write queue if the command is determined to be a large write command according to a second threshold.

10. The non-volatile storage device of claim 8, wherein the front end is configured to:
determine at least one eligible second-level queue of the plurality of second-level queues based on a command processing status received from the back end; and
remove the command from the one second-level queue according to the second schedule if the one second-level queue is one of the at least one eligible second-level queue.

11. The non-volatile storage device of claim 8, wherein each of the plurality of first-level queues and each of the plurality of second-level queues comprises a linked list.

12. A non-transitory computer readable medium having stored thereon instructions that when executed by a processor cause the processor to perform a method of processing commands in a controller of a non-volatile storage device that includes the controller, a host interface having a plurality of ports through which commands are received from a host system, a random access memory (RAM), and a non-volatile semiconductor memory, the method comprising the steps of:
(a) storing, by a front end of the controller, a command received from the host system into one first-level queue among a plurality of first-level queues that correspond to a port ID of one of the ports and are each configured in the RAM to store commands for a different one of a plurality of namespaces, the command being assigned to the one first-level queue corresponding to a particular namespace of the command among the plurality of first-level queues;
(b) removing, by the front end of the controller, the command from the plurality of first-level queues according to a first schedule;
(c) after step (b) of removing, performing, by the front end of the controller, at least one operation on the command, the at least one operation comprising a command check operation to determine whether the command is a valid command or an invalid command;
(d) after step (c) of performing, storing, by the front end of the controller, the command into one second-level queue among a plurality of second-level queues in the RAM, the command being stored in the one second-level queue that is a read queue if the command is a read command and the one second-level queue that is a write queue if the command is a write command;
(e) removing, by the front end of the controller, the command from the one second-level queue among the plurality of second-level queues according to a second schedule; and
(f) issuing the command from the front end of the controller, to a back end of the controller for processing.

13. The non-transitory computer readable medium of claim 12, wherein
the command is stored in a large read queue if the command is determined to be a large read command according to a first threshold; and
the command is stored in a large write queue if the command is determined to be a large write command according to a second threshold.

* * * * *